United States Patent
Homma et al.

(10) Patent No.: US 9,648,894 B2
(45) Date of Patent: May 16, 2017

(54) HARD BUTTER

(75) Inventors: Rika Homma, Utsunomiya (JP); Yoshihide Asabu, Sumida-ku (JP)

(73) Assignee: KAO CORPORATION, Tokyo (JP)

(*) Notice: Subject to any disclaimer, the term of this patent is extended or adjusted under 35 U.S.C. 154(b) by 1 day.

(21) Appl. No.: 14/240,206

(22) PCT Filed: Aug. 21, 2012

(86) PCT No.: PCT/JP2012/071088
§ 371 (c)(1),
(2), (4) Date: Feb. 21, 2014

(87) PCT Pub. No.: WO2013/027730
PCT Pub. Date: Feb. 28, 2013

(65) Prior Publication Data
US 2014/0193567 A1     Jul. 10, 2014

(30) Foreign Application Priority Data
Aug. 22, 2011  (JP) ................. 2011-180814

(51) Int. Cl.
| | | |
|---|---|---|
| A23G 1/38 | (2006.01) | |
| A23G 1/36 | (2006.01) | |
| A23D 9/007 | (2006.01) | |
| A23G 1/30 | (2006.01) | |
| A23G 3/40 | (2006.01) | |
| A23D 9/013 | (2006.01) | |

(52) U.S. Cl.
CPC ............ *A23G 1/38* (2013.01); *A23D 9/007* (2013.01); *A23D 9/013* (2013.01); *A23G 1/305* (2013.01); *A23G 1/36* (2013.01); *A23G 3/40* (2013.01)

(58) Field of Classification Search
CPC . A23G 1/38; A23G 1/305; A23G 1/36; A23G 3/40; A23D 9/013; A23D 9/007
See application file for complete search history.

(56) References Cited

U.S. PATENT DOCUMENTS

| | | | |
|---|---|---|---|
| 3,361,568 A * | 1/1968 | Kidger ............... | A23G 1/305 426/313 |
| 4,263,216 A | 4/1981 | Volpenhein | |
| 5,326,581 A | 7/1994 | Higashioka et al. | |
| 5,879,735 A | 3/1999 | Cain et al. | |
| 5,891,495 A | 4/1999 | Cain et al. | |
| 5,912,042 A | 6/1999 | Cain et al. | |
| 6,022,579 A | 2/2000 | Mori et al. | |
| 6,063,408 A * | 5/2000 | Yamazaki ........... | A23G 1/042 426/45 |
| 2006/0172057 A1 | 8/2006 | Cleenewerck | |
| 2011/0135805 A1* | 6/2011 | Doucet et al. ........ | 426/606 |
| 2012/0259133 A1 | 10/2012 | Homma et al. | |
| 2013/0023684 A1 | 1/2013 | Moriwaki et al. | |
| 2013/0230630 A1 | 9/2013 | Homma et al. | |
| 2013/0280407 A1 | 10/2013 | Homma et al. | |

FOREIGN PATENT DOCUMENTS

| | | | |
|---|---|---|---|
| CN | 1292644 A | 4/2001 | |
| CN | 1838886 A | 9/2006 | |
| EP | 0023062 A1 * | 1/1981 | ............... A23D 9/00 |
| EP | 0 744 899 | 12/1996 | |
| EP | 0 744 900 | 12/1996 | |
| JP | 3 147741 | 6/1991 | |
| JP | 4 135455 | 5/1992 | |
| JP | 4 258252 | 9/1992 | |
| JP | 5 168412 | 7/1993 | |
| JP | 7 38780 | 5/1995 | |
| JP | 7 313066 | 12/1995 | |
| JP | 9 510622 | 10/1997 | |
| JP | 11 243855 | 9/1999 | |
| WO | WO 99/59422 | 11/1999 | |
| WO | 2010 019598 | 2/2010 | |

OTHER PUBLICATIONS

Swern, D. 1979. Bailey's Industrial OIl and Fat Products, vol. 1, 4th edtiion. John Wiley & Sons, New York, p. 315.*
McGee, H. 2004. On Food and Cooking. p. 705.*
U.S. Appl. No. 14/350,955, filed Apr. 10, 2014, Homma.
U.S. Appl. No. 14/240,214, filed Feb. 21, 2014, Homma, et al.
U.S. Appl. No. 14/347,888, filed Mar. 27, 2014, Homma, et al.
U.S. Appl. No. 14/347,915, filed Mar. 27, 2014, Homma, et al.
U.S. Appl. No. 14/240,295, filed Feb. 21, 2014, Homma, et al.
U.S. Appl. No. 14/240,248, filed Feb. 21, 2014, Homma, et al.
U.S. Appl. No. 14/240,209, filed Feb. 21, 2014, Homma, et al.
International Preliminary Report on Patentability issued Mar. 6, 2014 in PCT/JP2012/071088 filed on Aug. 21, 2012 (English translation only).
Written Opinion issued Dec. 11, 2012 in PCT/JP2012/071088 filed on Aug. 21, 2012 (English translation only).
International Search Report Issued Dec. 11, 2012 in PCT/JP12/071088 Filed Aug. 21, 2012.
Extended European Search Report issued Mar. 18, 2015 in Patent Application No. 12825936.3.
F.H. Mattson, et al., "Synthesis and properties of glycerides" Journal of Lipid Research, vol. 3, No. 3, XP055175220, Jul. 1, 1962, pp. 281-296.
Archier P., et al., "The nature of some crystalline deposits in liquid palm oil. (translated)" Database Accession No. FS-1977-03-N-0159 International Food Information Service, vol. 23, No. 9, XP002737063, 1976, 1 Page.

* cited by examiner

*Primary Examiner* — Nikki H Dees
(74) *Attorney, Agent, or Firm* — Oblon, McClelland, Maier & Neustadt, L.L.P.

(57) ABSTRACT

Provided is a hard butter, comprising 55 mass % or more of diacylglycerols satisfying the following (1) and (2):
(1) 70 to 99 mass % of a disaturated diacylglycerol (SS) in the diacylglycerols; and
(2) 55 mass % or less of a total content of saturated fatty acids having 16 and 18 carbon atoms in constituent fatty acids of the diacylglycerols.

19 Claims, No Drawings

HARD BUTTER

FIELD OF THE INVENTION

The present invention relates to a hard butter and a chocolate including the same.

BACKGROUND OF THE INVENTION

Hard butters, which have been developed as alternatives to cacao butter being a raw material fat or oil for chocolates, are roughly classified into a tempering type hard butter and a non-tempering type hard butter, depending on crystallization properties of triacylglycerol. The non-tempering type hard butter does not require a tempering treatment, which requires strict temperature control in use, and is excellent in workability, and hence is widely used as a hard butter for confectionery production and bread production.

As the non-tempering type hard butter, there is known a lauric acid-based hard butter to be produced using, as a main raw material, a lauric acid-rich fat or oil such as coconut oil or palm kernel oil. The lauric acid-based hard butter is characterized by having a sharp and satisfactory melt-in-the-mouth feeling, but has low compatibility with cacao butter and cannot be blended with a large amount of cacao butter. Therefore, a chocolate produced using the lauric acid-based hard butter is poor in taste and flavor.

Meanwhile, with increasing health consciousness in recent years, low-calorie and low-fat edible fats or oils have been desired, and it is effective to use a fat or oil containing diacylglycerols at high concentrations. Hitherto, there has been reported, as a diacylglycerol-containing hard butter, a non-lauric acid-based hard butter including a bloom-preventing agent that includes a diglyceride containing one or more constituent fatty acids including a saturated fatty acid or trans unsaturated fatty acid having from 16 to 18 carbon atoms in one molecule (Patent Document 1).

CITATION LIST

Patent Document

[Patent Document 1] JP-A-5-168412

SUMMARY OF THE INVENTION

The present invention provides a hard butter, comprising 55 mass % or more of diacylglycerols satisfying the following (1) and (2):

(1) 70 to 100 mass % of a disaturated diacylglycerol (SS) in the diacylglycerols; and (2) 55 mass % or less of a total content of saturated fatty acids having 16 and 18 carbon atoms in constituent fatty acids of the diacylglycerols.

The present invention also provides a chocolate, comprising the above-mentioned hard butter.

DETAILED DESCRIPTION OF OUT THE INVENTION

However, a conventional diacylglycerol-containing hard butter has low compatibility with cacao butter, and a hard butter containing a large amount of a long-chain saturated fatty acid hardly has a satisfactory melt-in-the-mouth feeling. Further, in recent years, a trans unsaturated fatty acid has been reported to increase an LDL (bad) cholesterol level and increase the risk of coronary heart disease, and hence use of an edible fat or oil containing a large amount of trans unsaturated fatty acids tends to be avoided.

Therefore, the present invention relates to providing a hard butter and a chocolate, which have high compatibility with cacao butter, are excellent in melt-in-the-mouth feeling and the like, and have a high content of diacylglycerol.

The inventors of the present invention made intensive studies to search a fat or oil having excellent performance as a hard butter with focusing attention on the ratio of a diacylglycerol having a specific structure in diacylglycerols, and found that it is possible to produce a fat or oil having high compatibility with cacao butter, having a satisfactory melt-in-the-mouth feeling and the like, and having performance suited for the hard butter, when the fat or oil contains a specific amount of a diacylglycerol including only saturated fatty acids, and the ratio of a specific saturated fatty acid in diacylglycerols is adjusted within a predetermined range.

According to the present invention, it is possible to produce a hard butter having high compatibility with cacao butter and excellent in melt-in-the-mouth feeling, coatability, gloss, no stickiness, and preservation stability. A chocolate including the hard butter may contain a large amount of the cacao butter, and hence is excellent in taste and flavor.

The hard butter according to the present invention contains 55 mass % or more (hereinafter referred to as "%") of diacylglycerols, and the content of the diacylglycerols is preferably 70% or more, more preferably 75% or more, more preferably 80% or more, even more preferably 85% or more, and is preferably 95% or less, more preferably 90% or less. Specifically, the content of the diacylglycerols is preferably from 70 to 95%, more preferably from 75 to 95%, more preferably from 80 to 95%, even more preferably from 85 to 90%. The content of the diacylglycerols that falls within the above-mentioned range is preferred from the viewpoints of an excellent gloss and physiological effects.

The diacylglycerols in the present invention satisfy the following (1) and (2):

(1) 70 to 100% of a disaturated diacylglycerol (SS) in the diacylglycerols; and (2) 55% or less of a total content of saturated fatty acids having 16 and 18 carbon atoms in constituent fatty acids of the diacylglycerols.

In the diacylglycerols, the content of the disaturated diacylglycerol (SS), whose constituent fatty acids include two saturated fatty acids, is from 70 to 100%, preferably 75% or more, more preferably 80% or more, more preferably 85% or more, even more preferably 90% or more, and is preferably 99% or less. Specifically, the content is preferably from 70 to 99%, more preferably from 75 to 99%, more preferably from 85 to 99%, even more preferably from 90 to 99%. The content of SS that falls within the above-mentioned range is preferred from the viewpoint of no stickiness. The saturated fatty acids each have preferably from 8 to 22 carbon atoms, more preferably from 10 to 14 carbon atoms.

Further, in the diacylglycerols, the content of a diunsaturated diacylglycerol (UU), whose constituent fatty acids include two unsaturated fatty acids, is not particularly limited, but is preferably 25% or less, more preferably 20% or less, more preferably 15% or less, even more preferably 10% or less. The lower limit of the content of UU, which may be 0, is preferably 0.1% or more, more preferably 0.5% or more, even more preferably 1% or more. Specifically, the content is preferably from 0 to 25%, more preferably from 0.1 to 20%, more preferably from 0.1 to 15%, more preferably from 0.5 to 10%, even more preferably from 1 to 10%. The content of UU that falls within the above-mentioned range is preferred from the viewpoint of satisfactory crystallization property. The unsaturated fatty acids each have preferably from 14 to 24, more preferably from 16 to 22 carbon atoms, from the viewpoint of physiological effects.

In addition, in the diacylglycerols, the content of a monosaturated-monounsaturated diacylglycerol (SU), whose constituent fatty acids include a saturated fatty acid and an unsaturated fatty acid, is not particularly limited, but is preferably 25% or less, more preferably 23% or less, more preferably 20% or less, more preferably 15% or less, more preferably 10% or less, more preferably 5% or less, even more preferably 2% or less. The lower limit of the content of SU, which may be 0, is more preferably 0.1% or more. Specifically, the content is preferably from 0 to 23%, more preferably from 0 to 20%, more preferably from 0 to 15%, more preferably from 0 to 10%, more preferably from 0.1 to 5%, even more preferably from 0.1 to 2%. The content of SU that falls within the above-mentioned range is preferred from the viewpoint of satisfactory preservation stability.

The positions of the saturated fatty acid(s) and/or the unsaturated fatty acid(s) constituting each of the diacylglycerols may be the 1-position and 3-position of glycerol, or may be the 1-position and 2-position of glycerol.

The total content of the saturated fatty acids having 16 and 18 carbon atoms in the constituent fatty acids of the diacylglycerols is 55% or less, preferably 45% or less, more preferably 40% or less, more preferably 35% or less, more preferably 30% or less, even more preferably 25% or less. The lower limit of the total content of the saturated fatty acids, which may be 0, is preferably 1% or more, more preferably 5% or more, more preferably 10% or more, even more preferably 15% or more. Specifically, the total content is preferably from 1 to 55%, more preferably from 1 to 45%, more preferably from 5 to 40%, more preferably from 5 to 35%, more preferably from 5 to 30%, more preferably from 5 to 25%, more preferably from 10 to 25%, even more preferably from 15 to 25%. The total content of the saturated fatty acids that falls within the above-mentioned range is preferred from the viewpoints of a satisfactory melt-in-the-mouth feeling and preservation stability.

In addition, the total content of saturated fatty acids having 10, 12, and 14 carbon atoms in the constituent fatty acids of the diacylglycerols is preferably 40% or more, more preferably 45% or more, more preferably 50% or more, more preferably 55% or more, more preferably 60% or more, more preferably from 40 to 70%, more preferably from 45 to 70%, more preferably from 50 to 70%, more preferably from 55 to 70%, even more preferably from 60 to 70%, from the viewpoint of a satisfactory melt-in-the-mouth feeling.

It should be noted that the saturated fatty acids in the constituent fatty acids of the diacylglycerols each have preferably from 8 to 22 carbon atoms, more preferably from 10 to 14 carbon atoms, from the viewpoint of a satisfactory melt-in-the-mouth feeling.

The content of the unsaturated fatty acids in the constituent fatty acids of the hard butter according to the present invention is preferably from 0.5 to 30%, more preferably from 0.5 to 25%, more preferably from 0.5 to 20%, more preferably from 0.5 to 15%, even more preferably from 0.5 to 10%, from the viewpoint of excellent coating property.

The hard butter according to the present invention preferably contains triacylglycerols, and the content of the triacylglycerols is preferably 1% or more, more preferably 5% or more, even more preferably 10% or more, and is preferably 49% or less, more preferably 30% or less, more preferably 29% or less, more preferably 25% or less, more preferably 20% or less, more preferably 19% or less, more preferably 15% or less, even more preferably 14% or less. Specifically, the content is preferably from 1 to 49%, more preferably from 5 to 40%, more preferably from 5 to 30%, more preferably from 5 to 29%, more preferably from 5 to 19%, more preferably from 5 to 25%, even more preferably from 10 to 14%, from the viewpoints of industrial productivity and external appearance.

In addition, in the hard butter, the content of monoacylglycerols is preferably 10% or less, more preferably from 0.01 to 8%, and the content of free fatty acids (salts) is preferably 3.5% or less, more preferably from 0.01 to 1.5%, from the viewpoint of a taste and flavor or the like. The constituent fatty acids of the triacylglycerols and the monoacylglycerols are preferably the same as the constituent fatty acids of the diacylglycerols, from the viewpoints of physiological effects and the industrial productivity of the fat or oil.

The hard butter according to the present invention has a solid fat content at 5° C. of preferably from 60 to 95%, more preferably from 65 to 90%, even more preferably from 75 to 85%, from the viewpoint of no stickiness. In addition, the hard butter according to the present invention has a solid fat content at 20° C. of preferably from 25 to 65%, more preferably from 35 to 60%, even more preferably from 40 to 55%, from the viewpoint of satisfactory preservation stability.

The hard butter according to the present invention can be produced by, for example, separately preparing a fat or oil containing a high concentration of the disaturated diacylglycerol (SS), which includes only the saturated fatty acids, and a fat or oil containing a high concentration of the diunsaturated diacylglycerol (UU), which includes only the unsaturated fatty acids, respectively, and then blending the fats or oils so that the diacylglycerols have the above-mentioned specific composition. Further, if necessary, a usual edible fat or oil may be blended. It should be noted that, in the present invention, the "fat or oil" contains any one or more kinds of triacylglycerols, diacylglycerols, and monoacylglycerols.

The edible fat or oil may be any of a plant-derived fat or oil and an animal-derived fat or oil. A specific raw material therefor may be exemplified by: plant-derived fats or oils such as soybean oil, rapeseed oil, safflower oil, rice oil, corn oil, sunflower oil, cotton seed oil, olive oil, sesame oil, peanut oil, Job's tears seed oil, wheat germ oil, Japanese basil oil, linseed oil, perilla oil, sacha inchi oil, walnut oil, kiwi seed oil, salvia seed oil, grape seed oil, macadamia nut oil, hazelnut oil, pumpkin seed oil, camellia oil, tea seed oil, borage oil, palm oil, palm olein, palm stearin, coconut oil, palm kernel oil, cacao butter, sal butter, shea butter, and algae oil; and animal-derived fats or oils such as fish oil, lard, beef tallow, and butter fat. In addition, fats or oils such as transesterified oils, hydrogenated oils, and fractionated oils thereof may be used. In the case of using the hydrogenated oil, a fully hardened oil is preferably used because the amount of a trans unsaturated fatty acid in the total fatty acids constituting the fat or oil is decreased. The oils may be used singly or may be mixed appropriately before use. Of those, from the viewpoint of usability, a plant-derived fat or oil is preferably used.

A diacylglycerol-containing fat or oil can be obtained through an esterification reaction of a fat or oil-derived fatty acid and glycerin, a glycerolysis reaction of a fat or oil and glycerin, or the like. From the viewpoint of controlling the fatty acid composition, the diacylglycerol-containing fat or oil is preferably obtained by the esterification reaction of the fat or oil-derived fatty acid and glycerin.

The esterification reaction and/or the glycerolysis reaction are roughly classified into chemical methods using a chemical catalyst such as an alkali metal or an alloy thereof, or an oxide, hydroxide, or alkoxide having from 1 to 3 carbon atoms of an alkali metal or an alkali earth metal, and enzymatic methods using an enzyme such as a lipase. In particular, the reactions are preferably carried out under enzymatically mild conditions by using a lipase or the like as the catalyst, from the viewpoint of an excellent taste and flavor or the like.

After the esterification reaction and/or the glycerolysis reaction, a purification step usually employed for the fat or oil may be carried out. Specific examples thereof include steps of acid treatment, water washing, decoloration, and deodorization or the like.

The raw material fat or oil for the fatty acid used in the esterification reaction and the raw material fat or oil used in the glycerolysis reaction may be the fats or oils listed above as the edible fats or oils.

The hard butter according to the present invention may contain an emulsifier. The content of the emulsifier in the hard butter is preferably from 0.1 to 5%, more preferably from 0.5 to 3%, from the viewpoints of a taste and flavor, oxidation stability, and suppression of coloring or the like. The emulsifier is not particularly limited as long as the emulsifier is usually used for foods. Examples thereof include lecithin, a glycerin fatty acid ester, a sucrose fatty acid ester, and a polyglycerin fatty acid ester.

The hard butter according to the present invention is in a solid state at normal temperature (20° C.), and can be applied as a chocolate for coating, a chocolate for center-in, or a chocolate for plain chocolate. In particular, the hard butter is preferably used for a chocolate for coating of cake, biscuit, or bread or the like in confectionery production or bread production or the like, because the hard butter is excellent in external appearance (gloss) and causes no stickiness.

The term "chocolate" used herein is a collective term for chocolates, quasi chocolates, and chocolate-containing foods, prescribed in the fair competition rules related to the display of chocolate.

The content of the hard butter in the chocolate according to the present invention is preferably from 10 to 80%, more preferably from 10 to 70%, more preferably from 20 to 70%, more preferably from 20 to 60%, even more preferably from 30 to 60%.

In the case of preparing the chocolate using the hard butter according to the present invention, it is preferred to blend, for example: a saccharide such as glucose, sucrose, lactose, fructose, or starch syrup; a sugar alcohol such as sorbitol; milk powder such as whole milk powder, skim milk, or whey powder; an emulsifier; or a flavor, from the viewpoint of a taste and flavor.

In addition, the hard butter according to the present invention has high compatibility with cacao butter, and hence can be used for preparing the chocolate containing a large amount of the cacao butter. The content of the cacao butter in the chocolate is preferably from 1 to 25%, more preferably from 5 to 25%, from the viewpoint of a taste and flavor.

Next, aspects and preferred embodiments are described.

<1> A hard butter, comprising 55 mass % or more of diacylglycerols satisfying the following (1) and (2):
(1) 70 to 100% of a disaturated diacylglycerol (SS) in the diacylglycerols; and
(2) 55% or less of a total content of saturated fatty acids having 16 and 18 carbon atoms in constituent fatty acids of the diacylgyrecols.

<2> The hard butter according to Item <1>, in which the content of the diacylglycerols in the hard butter is 70% or more, preferably 75% or more, more preferably 80% or more, even more preferably 85% or more, and is 95% or less, preferably 90% or less.

<3> The hard butter according to Item <1> or <2>, in which the content of the disaturated diacylglycerol (SS), whose constituent fatty acids include two saturated fatty acids, in the diacylglycerols is 75% or more, preferably 80% or more, more preferably 85% or more, even more preferably 90% or more, and is 99% or less.

<4> The hard butter according to any one of Items <1> to <3>, in which the content of a diunsaturated diacylglycerol (UU), whose constituent fatty acids include two unsaturated fatty acids, in the diacylglycerols is 25% or less, preferably 20% or less, more preferably 15% or less, even more preferably 10% or less, and the lower limit thereof, which may be 0, is preferably 0.1% or more, more preferably 0.5% or more, even more preferably 1% or more.

<5> The hard butter according to any one of Items <1> to <4>, in which the content of a monosaturated-monounsaturated diacylglycerol (SU), whose constituent fatty acids include a saturated fatty acid and an unsaturated fatty acid, in the diacylglycerols is 25% or less, preferably 23% or less, more preferably 20% or less, more preferably 15% or less, more preferably 10% or less, more preferably 5% or less, even more preferably 2% or less, and the lower limit thereof, which may be 0, is preferably 0.1% or more.

<6> The hard butter according to any one of Items <1> to <5>, in which the total content of the saturated fatty acids having 16 and 18 carbon atoms in the constituent fatty acids of the diacylglyrecols is 45% or less, preferably 40% or less, more preferably 35% or less, more preferably 30% or less, even more preferably 25% or less, and the lower limit thereof, which may be 0, is preferably 1% or more, more preferably 5% or more, more preferably 10% or more, even more preferably 15% or more.

<7> The hard butter according to any one of Items <1> to <6>, in which the total content of saturated fatty acids having 10, 12, and 14 carbon atoms in the constituent fatty acids of the diacylglycerols is 40% or more, preferably 45% or more, more preferably 50% or more, more preferably 55% or more, more preferably 60% or more, more preferably from 40 to 70%, more preferably from 45 to 70%, more preferably from 50 to 70%, more preferably from 55 to 70%, even more preferably from 60 to 70%.

<8> The hard butter according to any one of Items <1> to <7>, in which the saturated fatty acids constituting the diacylglycerols each have from 8 to 22 carbon atoms, preferably from 10 to 14 carbon atoms.

<9> The hard butter according to any one of Items <1> to <8>, in which the content of the unsaturated fatty acids in the constituent fatty acids of the hard butter is from 0.5 to 30%, preferably from 0.5 to 25%, more preferably from 0.5 to 20%, more preferably from 0.5 to 15%, even more preferably from 0.5 to 10%.

<10> The hard butter according to anyone of Items <1> to <9>, further comprising 1% or more, preferably 5% or more, more preferably 10% or more and 49% or less, preferably 30% or less, more preferably 29% or less, preferably 25% or less, more preferably 20% or less, more preferably 19% or less, more preferably 15% or less, even more preferably 14% or less of triacylglycerols.

<11> The hard butter according to any one of Items <1> to <10>, further comprising 10% or less, preferably from 0.01 to 8% of monoacylglycerols, and 3.5% or less, preferably from 0.01 to 1.5% of free fatty acids (salts).

<12> The hard butter according to any one of Items <1> to <11>, in which the hard butter has a solid fat content at 5° C. of from 60 to 95%, preferably from 65 to 90%, more preferably from 75 to 85%, and has a solid fat content at 20° C. of from 25 to 65%, preferably from 35 to 60%, more preferably from 40 to 55%.

<13> The hard butter according to any one of Items <1> to <12>, obtained by separately preparing a fat or oil containing a high concentration of the disaturated diacylglycerol (SS), which includes only the saturated fatty acids, and a fat or oil containing a high concentration of the diunsaturated diacylglycerol (UU), which includes only the unsaturated fatty acids, respectively, blending the fats or oils so that the diacylglycerols have the above-mentioned composition, and if necessary, blending a usual edible fat or oil.

<14> The hard butter according to any one of Items <1> to <13>, further comprising from 0.1 to 5%, preferably from 0.5 to 3% of an emulsifier.

<15> A chocolate, comprising the hard butter according to any one of Items <1> to <14>.

<16> The chocolate according to Item <15>, in which the content of the hard butter in the chocolate is from 10 to 80%, preferably from 10 to 70%, more preferably from 20 to 70%, more preferably from 20 to 60%, even more preferably from 30 to 60%.

<17> The chocolate according to Item <15> or <16>, in which the content of cacao butter in the chocolate is from 1 to 25%, preferably from 5 to 25%.

EXAMPLES

Analysis Method (i) Composition of Glycerides in Fat or Oil and Hard Butter

About 10 mg of a sample and 0.5 mL of a trimethylsilylating agent ("Silylating agent TH," manufactured by Kanto Chemical Co., Inc.) were placed in a glass sample bottle, and the bottle was sealed and heated at 70° C. for 15 minutes. 1.0 mL of water and 1.5 mL of hexane were added thereto, and the bottle was shaken. The bottle was allowed to stand still, and then the upper layer was analyzed by gas-liquid chromatography (GLC).

<GLC Conditions>
(Conditions 1)
Apparatus: Agilent 6890 Series (manufactured by Agilent Technologies)
Integrator: ChemStationB 02.01 SR2 (manufactured by Agilent Technologies)
Column: DB-1ht (manufactured by Agilent J&W)
Carrier gas: 1.0 mL He/min
Injector: Split (1:50), T=320° C.
Detector: FID, T=350° C.
Oven temperature: increased from 80° C. to 340° C. at 10° C./min and kept for 15 minutes It should be noted that the contents of SS, SU, and UU in the diacylglycerols were determined under Conditions 2.
(Conditions 2)
Apparatus: Agilent 6890 Series (manufactured by Agilent Technologies)
Integrator: ChemStationB 02.01 SR2 (manufactured by Agilent Technologies)
Column: CP, TAP for Triglyceride (manufactured by VARIAN)
Carrier gas: 1.7 mL He/min
Injector: Split (1:50), T=345° C.
Detector: FID, T=355° C.
Oven temperature: kept at 220° C. for 12 minutes, increased to 305° C. at 10° C./min, kept for 15 minutes, increased to 355° C. at 10° C./min, and kept for 30 minutes
(ii) Composition of Constituent Fatty Acids in Fat or Oil and Hard Butter Fatty acid methyl esters were prepared in accordance with "Preparation method for fatty acid methyl ester (2.4.1.-1996)" described in "Standard Method for Analysis of Fats and Oils" edited by Japan Oil Chemists' Society, and the resultant fat or oil samples were subjected to measurement according to American Oil Chemists. Society Official Method Ce if-96 (GLC method).

(iii) Solid Fat Contents (SFCs) of Hard Butter and Cacao Butter

The solid fat contents (SFCs) of the hard butter and the cacao butter were measured by MARAN23 (Resonance Instruments Ltd.). A method of measuring the solid fat contents is described below.

(1) A sample filled in a test tube was kept at 60° C. for 30 minutes.

(2) The sample was kept at 0° C. for 30 minutes and then at 26° C. for 30 minutes.

(3) The sample was kept again at 0° C. for 30 minutes and then at 5° C. for 30 minutes, and the solid fat content was measured.

(4) Subsequently, the sample was kept at 10° C. for 30 minutes, and the solid fat content was measured.

(5) In the same way as above, the solid fat content was measured in the order of 15° C., 20° C., 25° C., 30° C., and 35° C.

(Preparation of Fats or Oils A to F)
(1) Fats or Oils A to D 100 parts by mass of coconut oil fatty acid and 20 parts by mass of glycerin were mixed, and the mixture was subjected to an esterification reaction using an enzyme, thereby obtaining a diacylglycerol (DAG)-containing fat or oil. Fatty acids and monoacylglycerols were removed from the resultant esterification reaction product by distillation, and the resultant was treated with an acid (an 10% aqueous solution of citric acid was added at a concentration of 2% by mass relative to the resultant), washed with water (distilled water three times), and brought into contact with activated clay (GALLEON EARTH V2R, MIZUSAWA INDUSTRIAL CHEMICALS, LTD.), thereby obtaining a decolored oil. Further, the oil was brought into contact with water vapor to deodorize the oil, thereby obtaining a fat or oil A (DAG: 78%).

In the same manner as the fat or oil A, 100 parts by mass of palm kernel oil fatty acid and 20 parts by mass of glycerin were used to obtain a fat or oil B (DAG: 78%).

In the same manner as the fat or oil A, 100 parts by mass of a mixed fatty acid of "soybean oil fatty acid: rapeseed oil fatty acid"=7:3 (mass ratio) and 20 parts by mass of glycerin were used to obtain a fat or oil C (DAG: 86%).

In the same manner as the fat or oil A, 100 parts by mass of hydrogenated coconut oil fatty acid and 20 parts by mass of glycerin were used to obtain a fat or oil D (DAG: 89%).

(2) Fat or Oil E 100 parts by mass of soybean extremely hardened oil (Yokozeki Oil & Fat Industries Co., Ltd.) and 40 parts by mass of glycerin were mixed, and the mixture was subjected to a glycerolysis reaction using sodium methylate as a catalyst, thereby obtaining a DAG-containing fat or oil. Fatty acids and monoacylglycerols were removed from the resultant glycerolysis reaction product by distillation, and the resultant was treated in the same manner as the fat or oil A, thereby obtaining a fat or oil E (DAG: 74%).

Table 1 shows analyzed values for the fats or oils A to E.
(3) Fat or Oil F

A fat or oil having the composition shown in Table 1 (Fat or oil F: refined palm kernel oil (KECK SENG (MALAYSIA) BERHAD) was used as a fat or oil F.

TABLE 1

| | Fatty acid composition (%) | | | | | | | | | Glyceride composition (%) | | | | |
|---|---|---|---|---|---|---|---|---|---|---|---|---|---|---|
| | C8 or less | C10:0 | C12:0 | C14:0 | C16:0 | C18:0 | C18:1 | C18:2 | C18:3 | DAG SS | DAG SU | DAG UU | MAG | TAG |
| Fat or oil A | 3.5 | 4.0 | 43.6 | 20.6 | 11.4 | 4.2 | 10.1 | 2.6 | | 59.4 | 17.3 | 1.3 | 0.9 | 20.9 |
| Fat or oil B | 2.0 | 2.4 | 42.0 | 16.3 | 9.7 | 3.1 | 21.1 | 3.4 | | 44.5 | 28.9 | 4.7 | 1.2 | 20.7 |
| Fat or oil C | | | | | 3.0 | 1.2 | 38.7 | 47.6 | 8.3 | | 14.8 | 71.2 | 0.5 | 13.5 |
| Fat or oil D | 4.3 | 4.5 | 46.8 | 20.0 | 10.6 | 13.7 | | | | 88.5 | | | 1.9 | 9.5 |
| Fat or oil E | | | | | 9.7 | 87.8 | | | | 74.0 | | | 9.1 | 16.9 |
| Fat or oil F | 3.1 | 3.3 | 46.1 | 15.9 | 8.7 | 2.5 | 17.5 | 2.8 | | 1.4 | | | | 98.6 |

MAG: Monoacylglycerol
DAG: Diacylglycerol
TAG: Triacylglycerol

Examples 1 to 3 and Comparative Examples 1 and 2

(1) Preparation of Hard Butter

The fats or oils A to F were melted at 80° C. at the blending ratios shown in Table 2 to prepare homogeneous mixtures. The mixtures were cooled to 25° C. while being kneaded using a chiller (emulsifying kneader, Tama Seiki Kogyo Co., Ltd.), successively preserved at 30° C. for 1 day, and then preserved in a refrigerator (5° C.).

TABLE 2

| | Example | | | Comparative Example | |
|---|---|---|---|---|---|
| | 1 | 2 | 3 | 1 | 2 |
| Fat or oil A | | | 98 | | |
| Fat or oil B | | | | 95 | |
| Fat or oil C | 2 | 5 | 2 | | |
| Fat or oil D | 98 | 90 | | 5 | |
| Fat or oil E | | 5 | | | |
| Fat or oil F | | | | | 100 |
| Ratio in fat or oil (%) | | | | | |
| Unsaturated fatty acid | 1.9 | 4.7 | 14.4 | 23.3 | 20.3 |
| DAG | 88.5 | 87.7 | 78.2 | 78.5 | 2.3 |
| Ratio in DAG (%) | | | | | |
| SS | 98.1 | 95.1 | 74.5 | 59.4 | 61.9 |
| SU | 0.3 | 0.8 | 22.1 | 34.9 | 33.5 |
| UU | 1.6 | 4.1 | 3.4 | 5.7 | 4.5 |
| C10:0 + C12:0 + C14:0 | 69.9 | 64.2 | 66.8 | 61.2 | 65.4 |
| C16:0 + C18:0 | 24.0 | 27.0 | 15.4 | 13.3 | 11.2 |

(2) Evaluation of Compatibility with Cacao Butter

The hard butter prepared in (1) and cacao butter (manufactured by DAITOCACAO. CO., LTD.) were mixed at mixing ratios (hard butter/cacao butter) of 90/10, 85/15, 80/20, and 75/25, and the solid fat content (SFC) was measured at each mixing ratio and each temperature. Based on the SFC measured, degrees of compatibility were calculated by the following equation.

Degree of compatibility (%)={(measured SFC at each mixing ratio and each temperature)/(weighted average SFC at the mixing ratio based on measured SFC of hard butter and measured SFC of cacao butter at the temperature)}×100

Table 3 shows the results of evaluation (measurement results). The higher the degree of compatibility at each mixing ratio and each temperature became, the compatibility with the cacao butter became more satisfactory.

TABLE 3

| | Mixing ratio of hard butter of Example 1/cacao butter | | | | Mixing ratio of hard butter of Example 2/cacao butter | | | | Mixing ratio of hard butter of Example 3/cacao butter | | | |
|---|---|---|---|---|---|---|---|---|---|---|---|---|
| | 90/10 | 85/15 | 80/20 | 75/25 | 90/10 | 85/15 | 80/20 | 75/25 | 90/10 | 85/15 | 80/20 | 75/25 |
| 25° C. | 78 | 72 | 68 | 63 | 87 | 82 | 76 | 69 | 81 | 72 | 66 | 59 |
| 30° C. | 75 | 70 | 66 | 62 | 87 | 83 | 77 | 73 | 85 | 78 | 70 | 68 |
| 35° C. | 54 | 48 | 37 | 30 | 86 | 78 | 69 | 60 | — | — | — | — |

| | Mixing ratio of hard butter of Comparative Example 1/cacao butter | | | | Mixing ratio of hard butter of Comparative Example 2/cacao butter | | | |
|---|---|---|---|---|---|---|---|---|
| | 90/10 | 85/15 | 80/20 | 75/25 | 90/10 | 85/15 | 80/20 | 75/25 |
| 25° C. | 79 | 69 | 60 | 52 | 68 | 53 | 40 | 28 |
| 30° C. | 81 | 71 | 60 | 48 | — | — | — | — |
| 35° C. | — | — | — | — | — | — | — | — |

From Table 3, the inventive products have satisfactory compatibility with cacao butter as compared to the hard butters of Comparative Examples. In particular, the products have satisfactory compatibility at from 30 to 35° C., and thus it found that they are less likely to deteriorate in heat resistance.

Examples 4 to 12 and Comparative Examples 3 to 7

(1) Preparation of Hard Butter

The fats or oils A to F were melted at 80° C. at the blending ratios shown in Table 4 to prepare homogeneous mixtures. The mixtures were cooled to 25° C. while being kneaded using a chiller (emulsifying kneader, Tama Seiki Kogyo Co., Ltd.), successively preserved at 30° C. for 1 day, and then preserved in a refrigerator (5° C.), thereby preparing hard butters.

2: Slight insoluble residue feeling
1: Insoluble residue feeling
(Coatability)
The samples were evaluated for their coatability when the chocolates were used for coating in accordance with the following criteria.
4: Very satisfactory in extensibility
3: Satisfactory in extensibility
2: Slightly poor extensibility
1: Poor extensibility
(External Appearance (Gloss))
The samples were preserved at 30° C. for 1 week, visually observed, and evaluated for their external appearance during preservation in accordance with the following criteria.
4: Very smooth and glossy surface
3: Smooth surface
2: Slightly rough and slightly non-glossy surface
1: Rough and non-glossy surface
(Stickiness)

TABLE 4

|  | Example | | | | | | | | | Comparative Example | | | | |
| --- | --- | --- | --- | --- | --- | --- | --- | --- | --- | --- | --- | --- | --- | --- |
|  | 4 | 5 | 6 | 7 | 8 | 9 | 10 | 11 | 12 | 3 | 4 | 5 | 6 | 7 |
| Fat or oil A |  |  |  |  | 98 | 85 | 85 | 50 | 30 |  |  |  |  | 40 |
| Fat or oil B |  |  |  |  |  |  |  |  |  | 95 |  |  |  |  |
| Fat or oil C | 2 | 10 | 5 | 20 | 2 |  |  | 10 |  |  | 35 |  |  |  |
| Fat or oil D | 98 | 90 | 90 | 80 |  | 15 |  | 40 | 30 | 5 | 65 |  | 30 |  |
| Fat or oil E |  |  | 5 |  |  |  | 15 |  | 40 |  |  |  |  | 60 |
| Fat or oil F |  |  |  |  |  |  |  |  |  |  |  | 100 | 70 |  |
| Ratio in fat or oil (%) |  |  |  |  |  |  |  |  |  |  |  |  |  |  |
| Unsaturated fatty acid | 1.9 | 9.5 | 4.7 | 18.9 | 14.4 | 10.8 | 10.8 | 15.8 | 3.8 | 23.3 | 33.1 | 20.3 | 14.2 | 5.1 |
| DAG | 88.5 | 88.3 | 87.7 | 88.0 | 78.2 | 79.6 | 77.4 | 83.0 | 79.6 | 78.5 | 87.6 | 2.3 | 28.2 | 75.6 |
| Ratio in DAG (%) |  |  |  |  |  |  |  |  |  |  |  |  |  |  |
| SS | 98.1 | 90.3 | 95.1 | 80.5 | 74.5 | 80.1 | 79.6 | 78.4 | 93.0 | 59.4 | 65.6 | 61.9 | 97.8 | 90.2 |
| SU | 0.3 | 1.7 | 0.8 | 3.4 | 22.1 | 18.5 | 19.0 | 12.2 | 6.5 | 34.9 | 5.9 | 33.5 | 1.9 | 9.2 |
| UU | 1.6 | 8.1 | 4.1 | 16.2 | 3.4 | 1.4 | 1.4 | 9.3 | 0.5 | 5.7 | 28.4 | 4.5 | 0.3 | 0.7 |
| C10:0 + C12:0 + C14:0 | 69.9 | 64.2 | 64.2 | 57.0 | 66.8 | 68.6 | 57.9 | 62.6 | 41.8 | 61.2 | 46.4 | 65.4 | 67.2 | 27.3 |
| C16:0 + C18:0 | 24.0 | 22.3 | 27.0 | 20.3 | 15.4 | 16.9 | 27.9 | 18.0 | 51.0 | 13.3 | 17.3 | 11.2 | 15.1 | 64.7 |
| SFC (%) |  |  |  |  |  |  |  |  |  |  |  |  |  |  |
| 5° C. | 80.9 | 74.3 | 79.2 | 66.1 | 62.1 | 66.3 | 68.6 | 64.7 | 83.0 | 54.5 | 53.7 | 70.7 | 74.3 | 84.2 |
| 20° C. | 48.0 | 44.1 | 48.9 | 39.2 | 28.8 | 32.3 | 39.2 | 34.3 | 61.5 | 26.1 | 31.9 | 39.0 | 42.0 | 68.8 |
| Evaluation of chocolate |  |  |  |  |  |  |  |  |  |  |  |  |  |  |
| Melt-in-the-mouth feeling | 4 | 4 | 3 | 4 | 4 | 4 | 3 | 4 | 2 | 4 | 4 | 4 | 3 | 1 |
| Coatability | 4 | 4 | 4 | 3 | 3 | 3 | 3 | 3 | 4 | 2 | 1 | 2 | 3 | 4 |
| External appearance (gloss) | 4 | 4 | 4 | 4 | 3 | 4 | 3 | 4 | 4 | 3 | 4 | 1 | 1 | 4 |
| Stickiness | 4 | 4 | 4 | 4 | 3 | 4 | 4 | 4 | 4 | 1 | 1 | 1 | 4 | 4 |
| Preservation stability | 4 | 4 | 4 | 4 | 4 | 4 | 4 | 4 | 4 | 1 | 4 | 1 | 4 | 4 |

(2) Preparation of Chocolate 100 parts by mass of each of the hard butters prepared in (1), 80 parts by mass of sugar, and 20 parts by skim milk were mixed at 60° C. to prepare a chocolate for coating. The resultant chocolate was used for coating the whole surface of a biscuit to prepare a sample, and the sample was used to evaluate the chocolate as below.
Table 4 shows the results.
(Melt-in-the-Mouth Feeling)
Five special panelists ate the samples to evaluate the chocolates for the melt-in-the-mouth feeling in accordance with the following criteria, and the average values were calculated as scores of the samples.
4: No insoluble residue feeling
3: Almost no insoluble residue feeling The samples were preserved at 30° C. for 1 week, touched by fingers, and evaluated for their stickiness in accordance with the following criteria.
4: No stickiness
3: Almost no stickiness
2: Slight stickiness
1: Stickiness
(Preservation Stability)
The samples were preserved at 30° C. for 1 week on filter paper, and evaluated for their preservation stability in accordance with the following criteria.
4: Little oozing on filter paper
3: A little and unclear oozing on filter paper
2: Rather clear oozing on filter paper
1: Much oozing on filter paper
As is apparent from Table 4, the chocolates of the inventive product have a satisfactory melt-in-the-mouth feeling as compared to those of Comparative Examples, and are excellent in coatability, external appearance (gloss), no stickiness, and preservation stability.

The invention claimed is:

1. A chocolate, comprising:
   a hard butter in a content of from 10 to 80 mass %, based on the mass of the chocolate and
   cacao butter in a content of from 5 to 25 mass %, based on the mass of the chocolate,
   wherein the hard butter comprises 55 mass % or more of diacylglycerols satisfying at least (1) and (2):
   (1) 70 to 100 mass % of a disaturated diacylglycerol (SS) in the diacylglycerols; and
   (2) 55 mass % or less of a total content of saturated fatty acids having 16 and 18 carbon atoms in constituent fatty acids of the diacylglycerols.

2. The chocolate according to claim 1, wherein the diacylglycerols in the hard butter satisfy at least (1) and (2):
   (1) 70 mass % or more and 100 mass % or less of the disaturated diacylglycerol (SS) in the diacylglycerols; and
   (2) 1 mass % or more and 55 mass % or less of a total content of saturated fatty acids having 16 and 18 carbon atoms in constituent fatty acids of the diacylglycerols.

3. The chocolate according to claim 1, wherein the diacylglycerols in the hard butter satisfy at least (1) and (2):
   (1) 70 mass % or more and 99 mass % or less of the disaturated diacylglycerol (SS) in the diacylglycerols; and
   (2) 5 mass % or more and 30 mass % or less of a total content of saturated fatty acids having 16 and 18 carbon atoms in constituent fatty acids of the diacylglycerols.

4. The chocolate according to claim 1, wherein the diacylglycerols in the hard butter satisfy at least (1) and (2):
   (1) 75 mass % or more and 99 mass % or less of the disaturated diacylglycerol (SS) in the diacylglycerols; and
   (2) 5 mass % or more and 25 mass % or less of a total content of saturated fatty acids having 16 and 18 carbon atoms in constituent fatty acids of the diacylglycerols.

5. The chocolate according to claim 1, wherein the diacylglycerols in the hard butter satisfy at least (1) and (2):
   (1) 85 mass % or more and 99 mass % or less of the disaturated diacylglycerol (SS) in the diacylglycerols; and
   (2) 15 mass % or more and 25 mass % or less of a total content of saturated fatty acids having 16 and 18 carbon atoms in constituent fatty acids of the diacylglycerols.

6. The chocolate according to claim 1, wherein the diacylglycerols in the hard butter further satisfy (3):
   (3) 25 mass % or less of a monosaturated-monounsaturated diacylglycerol (SU) in the diacylglycerols.

7. The chocolate according to claim 6, wherein the diacylglycerols in the hard butter satisfy (3):
   (3) 20 mass % or less of the monosaturated-monounsaturated diacylglycerol (SU) in the diacylglycerols.

8. The chocolate according to claim 6, wherein the diacylglycerols in the hard butter satisfy (3):
   (3) 0.1 mass % or more and 5 mass % or less of the monosaturated-monounsaturated diacylglycerol (SU) in the diacylglycerols.

9. The chocolate according to claim 1, wherein the diacylglycerols in the hard butter further satisfy (4):
   (4) 25 mass % or less of a diunsaturated diacylglycerol (UU) in the diacylglycerols.

10. The chocolate according to claim 9, wherein the diacylglycerols in the hard butter satisfy (4):
    (4) 0.5 mass % or more and 10 mass % or less of the diunsaturated diacylglycerol (UU) in the diacylglycerols.

11. The chocolate according to claim 1, wherein a content of the diacylglycerols in the hard butter is 80 mass % or more and 95 mass % or less.

12. The chocolate according to claim 1, wherein a total content of saturated fatty acids having 10, 12 and 14 carbon atoms in the constituent fatty acids of the diacylglycerols in the hard butter is 40 mass % or more.

13. The chocolate according to claim 1, wherein a total content of saturated fatty acids having 10, 12 and 14 carbon atoms in the constituent fatty acids of the diacylglycerols in the hard butter is 60 mass % or more.

14. The chocolate according to claim 1, wherein a total content of saturated fatty acids having 10, 12 and 14 carbon atoms in the constituent fatty acids of the diacylglycerols in the hard butter is 60 mass % or more and 70 mass % or less.

15. The chocolate according to claim 1, wherein the hard butter further comprises from 5 to 49 mass % of triacylglycerols, from 0.01 to 8 mass % of monoacylglycerols, and from 0.01 to 1.5 mass % of free fatty acids.

16. The chocolate according to claim 1, wherein the hard butter has a solid fat content at 5° C. of from 60 to 95%.

17. The chocolate according to claim 1, wherein the hard butter has a solid fat content at 20° C. of from 25 to 65%.

18. The chocolate of claim 1, wherein a mass ratio of the hard butter to the cacao butter at 25° C. is from 75/25 to 90/10 and wherein a degree of compatibility between the hard butter and the cacao butter is at least from 59 to 87.

19. The chocolate of claim 1, wherein a mass ratio of the hard butter to the cacao butter at 25° C. is from 80/20 to 90/10 and wherein a degree of compatibility between the hard butter and the cacao butter is from 66 to 87.

* * * * *